United States Patent [19]

Vergues et al.

[11] Patent Number: 4,482,828
[45] Date of Patent: Nov. 13, 1984

[54] DISCONNECTABLE ELECTROMAGNETIC ECCENTRIC ACTUATOR

[75] Inventors: Jacques Vergues, Valence; Roland Rubet, Chabeuil, both of France

[73] Assignee: CROUZET, Paris, France

[21] Appl. No.: 436,709

[22] Filed: Oct. 26, 1982

[30] Foreign Application Priority Data

Oct. 29, 1981 [FR] France ................. 81 20503

[51] Int. Cl.³ .................... F16H 27/10; F16H 1/18
[52] U.S. Cl. ................... 310/83; 74/424.8 R; 310/80
[58] Field of Search .......... 74/390, 424.8 R, 424.8 C, 74/458, 459, 89.15, 424.8 A; 310/12, 49 R, 80, 83, 75 R, 75 D, 82

[56] References Cited

U.S. PATENT DOCUMENTS

| | | | |
|---|---|---|---|
| 2,561,890 | 7/1951 | Stoddard | 310/82 |
| 3,128,634 | 4/1964 | Eastman | 74/424.8 C |
| 3,529,124 | 9/1970 | MacFarlane et al. | 310/83 |
| 3,698,258 | 10/1972 | Gärtner | 74/424.8 |
| 4,337,671 | 7/1982 | Ulf | 74/424.8 C |
| 4,352,300 | 10/1982 | Esch | 74/424.8 R |

Primary Examiner—J. D. Miller
Assistant Examiner—D. L. Rebsch
Attorney, Agent, or Firm—Holman & Stern

[57] ABSTRACT

The present invention relates to a disconnectable electromagnetic eccentric actuator for controlling a mobile member for automatically adjusting a machine. The eccentric actuator comprises a ferromagnetic drive force transmitting screw and nut (of larger diameter than the screw) to convert into axial movement the cycloidal rolling movement of the screw relatively to the wall of the fixed nut, the latter itself forming an integral part of means for converting an electromotive force into a displaceable magnetomotive force whose resultant generated flux causes mutual adhesion, as well as said cycloidal relative movement of the screw and the nut. The screw disconnects when supply current is cut off. The invention is applicable to the automatic control of a flap for regulating the temperature of the intake air in heat engines.

1 Claim, 5 Drawing Figures

DISCONNECTABLE ELECTROMAGNETIC ECCENTRIC ACTUATOR

BACKGROUND OF THE INVENTION

The present invention relates to a disconnectable electromagnetic jack or eccentric actuator for controlling a mobile member for automatically adjusting a machine.

Among the numerous applications possible, the one for which technical problems are at the origin of the invention belongs to the domain of heat engines, and particularly for the automobile vehicle, where it has been observed that the regulation of the temperature of the intake air had a considerable direct influence on fuel saving.

According to usual practice, this regulation is obtained due to the controlled mix of a variable quantity of fresh ambient air sucked in from outside the operational enclosure of the engine and of reheated air, for example air in contact with the exhaust pipe.

Optimum metering of the air mixture admitted into the engine is generally obtained by the displacement of a mobile flap located upstream of the air filter and at the junction of two admission conduits. The flap is usually actuated by the deformation of a membrane subjected to the depression of the inlet manifold via a valve of which the leakage rate is regulated by a device incorporating a bimetallic strip sensitive to the variations in temperature of the air admitted.

The major drawback of this technique, although simple and economical to carry out, is the imprecise control that it achieves, by reason of the inherent elasticity of the device, due to the use of a membrane. In fact, under the effect of the rhythmic pulsations of the engine, the associated mass of the mobile elements of the device is constantly subjected to more or less resonant oscillations detrimental to the desired precision of control.

It is essentially an object of the present invention to eliminate this drawback by proposing a simple, reliable device, economical to produce, whose positive action is virtually bereft of natural elasticity, prevents the tendency to parasitic vibrations and consequently procures strict precision of adjustment in a predetermined range.

The device of the invention further aims at instantaneous disconnection of the positive control action simply by switching off its electrical supply, by design or by accident.

SUMMARY OF THE INVENTION

To this end, the present invention relates to a disconnectable electromagnetic jack or eccentric actuator for controlling a mobile member for automatically adjusting a machine, characterized in that it comprises ferromagnetic drive force transmitting means adapted to convert into axial movement the cyloidal rotating movement of at least one mobile element relatively to a fixed element, the latter itself forming an integral part of means for converting an electromotive force into a displaceable magnetomotive force whose resultant generated flux causes mutual adhesion as well as said cycloidal relative movement of said ferromagnetic means.

In an industrial embodiment specially for application to automobile vehicles as envisaged hereinabove, said ferromagnetic transmitting means comprise a ferromagnetic screw and nut in which the difference in diameters as well as the arrangement of the respective threads allow either the reciprocal axial engagement or disengagement, and said conversion means comprise an electromagnetic multipolar inductor device of which a portion of each elementary stator circuit is constituted by an angular segment of said nut on the threaded wall of the bore of which said screw is capable of rolling, determining an axial driving force under the combined effect of the rotating magnetic adherence and of the mechanical stress imposed by the tangential cooperation of the threads of the screw and nut.

BRIEF DESCRIPTION OF THE DRAWINGS

The invention will be more readily understood on reading the following description with reference to the accompagnying drawings, in which.

DETAILED DESCRIPTION OF A PREFERRED EMBODIMENT OF THE INVENTION

Figure 1:
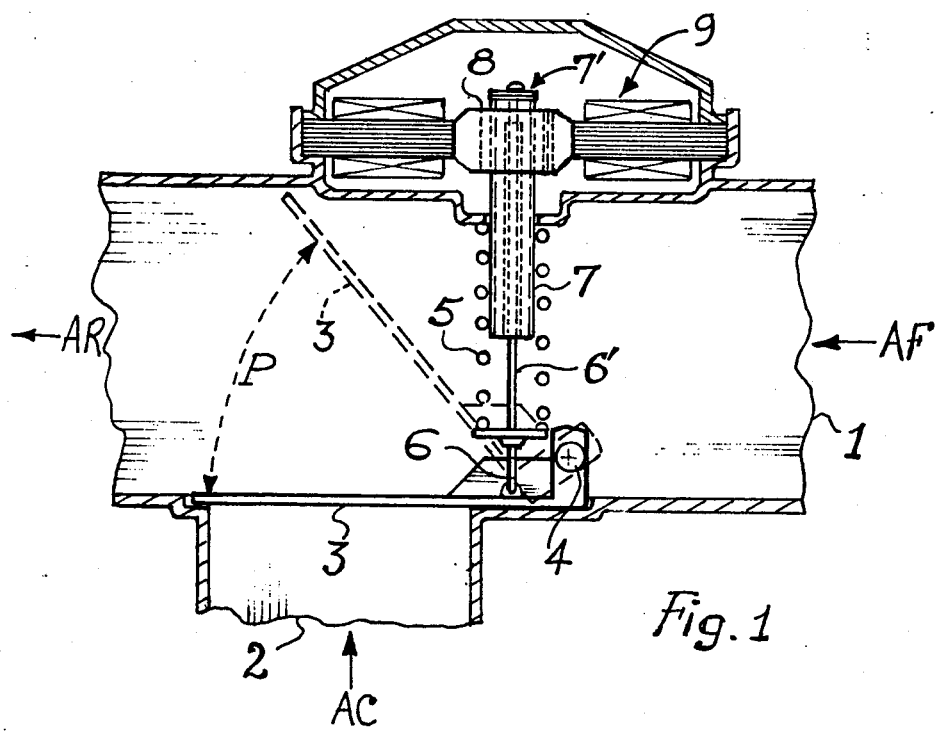
FIG. 1 is an overall view in axial section of a device for regulating the reheated air admitted into an automobile engine, this device being provided with the eccentric actuator according to the invention.

Referring now to the drawings, the regulator device shown in FIG. 1 comprises, in known manner, two conduits 1 and 2, at the junction of which a mobile flap 3 regulates the relative determination of a certain flow of cold air (AF) coming from the outside through conduit 1, and of hot air (AC) coming from an inner artificial source through conduit 2, in order to obtain a regulated mixture of warm air (AR) appropriate for the optimum economical working of a heat engine.

The flap 3 which is articulated on a pivot pin 4 fast with the conduits 1 and 2, may occupy all the intermediate positions P between those corresponding to complete closing either of the hot air conduit 2 (AC), or of cold air conduit (AF). However, it should be emphasized that in the application in question the rest position of the flap 3 normally imposed is the one shown in solid lines in FIG. 1, which corresponds to the losing of the hot air conduit 2 (AC). Abnormally prolonged admission at excessive temperature would be detrimental to functioning and long-life of the engine.

This requirement is the main reason for which the normal rest position of the flap 3 is imposed by the precompressed spring 5 of which the effort of release, bearing on the inner wall of the conduit 1, is permanently exerted on the flap 3 via a rigid articulation rod 6.

Actuation of the flap 3 in all the positions between the normal rest position previously defined and the maximum working position shown in broken lines and corresponding to the minimum admission of cold air (AF), is effected by the disconnectable transmitter member of the eccentric actuator according to the invention, of which the drive force is exerted against the permanent return action of the spring 5.

The mobile transmitter member of the eccentric actuator is a tubular screw 7 penetrating in the conduit 1 and coaxially fast with the spring 5 due to a flexible shouldered traction rod 6' extending the rigid articulation rod 6 up to a fastening device 7' located at the end of the bore of the screw 7 on the upper face of which it abuts, allowing their freedom of relative rotation.

Figure 5:
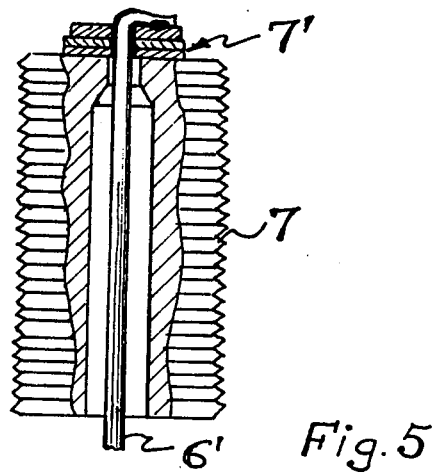
FIG. 5 is a side view in partial section of the screw of the transmitter of FIG. 3.

The rotating fastening device 7' is shown in detail in FIG. 5 by way of example. It comprises a simple stack of superposed washers in sliding abutment with respect to one another, on the last of which the rod 6' is fixed, for example by welding.

Figure 3:
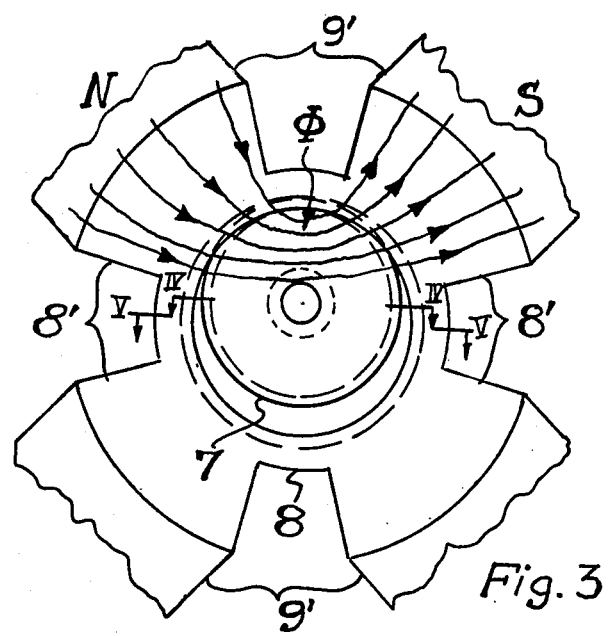
FIG. 3 is a partial view, on a larger scale than in FIG. 2, of the disconnectable ferromagnetic transmitter device.

The screw 7 (FIG. 5) which cooperates with the nut 8 (FIG. 4) has the particular feature that its outer maximum diameter is smaller than the inner minimum diameter of the nut (FIG. 3).

This dimensional position makes it possible to ensure, in the absence of tangential engagement of their respective thread, the relative axial freedom of the screw 7 and of the nut 8, and consequently enables mechanical disconnection of the eccentric actuator.

Figure 2:
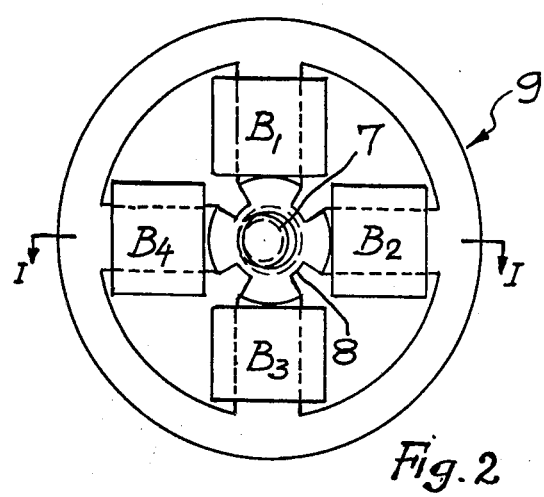
FIG. 2 shows, in plan view, the stator device of the eccentric actuator of FIG. 1.

The nut 8 which, like screw 7, is made of a nonremanent ferromagnetic material, is fitted by forcing its peripheral pole shoes 8' at the center of a multipolar stator device comprising, in the embodiment shown in FIG. 2, an assembly of four coils $B_1$, $B_2$, $B_3$, $B_4$ corresponding to the four poles 9' of the stator and to the four poles 8' of the nut. Simultaneous electrical excitation of two adjacent coils provokes the tangential adherence of the screw 7 in the narrowed interpolar zone of the nut 8 presenting the greatest reluctance and consequently an intense induction flux $\Phi$ in the part of the screw 7 nearest the pair of excited stator poles (NS) (FIG. 3).

When simultaneous excitation of two adjacent coils is effected successively in the following order : ($B_1$-$B_2$), ($B_2$-$B_3$), ($B_3$-$B_4$), ($B_4$-$B_1$), etc . . . , this results in an angular translation of the flux $\Phi$ in the bore of the stator nut 8 such that the rotor screw 7 is moved step by step by rolling on the inner wall of the nut 8.

This movement of cycloidal nature leads the respective threads of the screw 7 and of the nut 8 to cooperate mechanically so that there results the axial movement of the screw 7 and consequently the mechanical transmission in the shank of said screw 7 of the rotating magnetomotive force of stator origin. However, it should be specified that, to obtain the relative axial movement of the elements of a screw-nut system animated by a cycloidal movement, the helical thread of one of the elements must cooperate tangentially with the non-helical thread of the other element. In other words, the non-helical thread must be in the form of a plurality of parallel threads of zero pitch, comparable to a rack with circular teeth.

Figure 4:
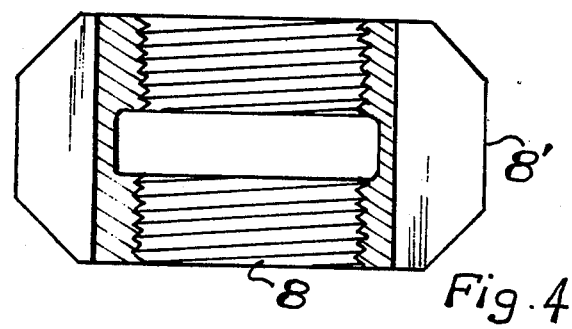
FIG. 4 is a side view in section of the nut of the transmitter of FIG. 3.

FIGS. 3, 4 and 5 illustrate on this point the particular embodiment of the invention where the stator nut 8 comprises a helical thread cooperating tangentially with the rotor screw 7 whose thread—of complementary profile—is composed of a series of parallel threads of zero axial inclination. Under these conditions, a cycle of excitation of the coils provokes displacement of the screw 7 by the width of one thread.

However, the system may function with two helical threads on condition that the rolling of the screw inside the nut provokes, due to the difference in diameter, a rotation of the screw with respect to the nut.

What is claimed is:

1. A disconnectable electromagnetic eccentric actuator for controlling a mobile member for automatically adjusting a machine comprising:

ferromagnetic drive force transmitting means for converting into axial movement the cycloidal rotating movement of at least one mobile element relative to a fixed element, the fixed element comprising an integral part of means for converting an electromotive force into a displaceable magnetomotive force with a resultant generated flux that provokes mutual adhesion as well as said cycloidal relative movement of said ferromagnetic transmitting means;

wherein said ferromagnetic transmitting means comprises a ferromagnetic screw and nut in which the difference in diameters as well as the arrangement of the respective threads allow either reciprocal axial engagement or disengagement, and wherein said conversion means comprises an electromagnetic multipolar inductor device having elementary stator circuit means of which a portion of each is constituted by an angular segment of said nut on the threaded wall of the bore of which said screw is capable of rolling, thereby determining an axial driving force under the combined effect of the rotating magnetic adherence and of the mechanical stress imposed by the tangential cooperation of the threads of the screw and nut.

* * * * *